US009295016B2

(12) United States Patent
Tan et al.

(10) Patent No.: US 9,295,016 B2
(45) Date of Patent: Mar. 22, 2016

(54) COOPERATIVE PHASE TRACKING IN DISTRIBUTED MULTIPLE-INPUT MULTIPLE-OUTPUT SYSTEM

(71) Applicant: Microsoft Corporation, Redmond, WA (US)

(72) Inventors: Kun Tan, Beijing (CN); Taotao Wang, Beijing (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 13/915,992

(22) Filed: Jun. 12, 2013

(65) Prior Publication Data

US 2014/0369321 A1    Dec. 18, 2014

(51) Int. Cl.
*H04Q 7/00* (2006.01)
*H04W 56/00* (2009.01)
*H04B 7/02* (2006.01)
*H04L 5/00* (2006.01)
*H04W 24/08* (2009.01)
*H04B 7/01* (2006.01)
*H04B 7/04* (2006.01)
*H04B 7/06* (2006.01)

(52) U.S. Cl.
CPC ............ *H04W 56/001* (2013.01); *H04B 7/01* (2013.01); *H04B 7/024* (2013.01); *H04B 7/0456* (2013.01); *H04B 7/0643* (2013.01); *H04L 5/0003* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 6,680,932 B1 * | 1/2004 | Hsuan et al. | 370/350 |
| 7,224,984 B2 | 5/2007 | Agrawala et al. | |
| 8,208,963 B2 * | 6/2012 | Codreanu et al. | 455/562.1 |
| 2009/0110033 A1 * | 4/2009 | Shattil | 375/141 |
| 2009/0232240 A1 * | 9/2009 | Lakkis | 375/260 |
| 2010/0322166 A1 | 12/2010 | Sampath et al. | |
| 2011/0069629 A1 * | 3/2011 | Breit et al. | 370/252 |
| 2011/0134899 A1 * | 6/2011 | Jones et al. | 370/338 |
| 2012/0051476 A1 | 3/2012 | Shi et al. | |

(Continued)

FOREIGN PATENT DOCUMENTS

| | | |
|---|---|---|
| EP | 2566261 A2 | 3/2013 |
| WO | WO2013034003 A1 | 2/2013 |

OTHER PUBLICATIONS

"International Search Report Issued for PCT Application No. PCT/US2014/041449", Mailed Date: Nov. 24, 2014, 20 Pages.

(Continued)

*Primary Examiner* — Duc C Ho
(74) *Attorney, Agent, or Firm* — Sandy Swain; Harri Valio; Micky Minhas

(57) ABSTRACT

A cooperative phase tracking system allows access points of a wireless network (e.g., a WiFi network) to use a clock or oscillator that may be different or independent from other access points of the same wireless network. As such, the cooperative phase tracking system eliminates a limitation of using a same clock (or oscillator) among the access points and at the same time may allow more access points to be installed for an associated wireless network to serve a larger area. Moreover, the cooperative phase tracking system may attribute intensive computations of relative phase drifts associated with the access points to a dedicated coordinator, thereby alleviating workload of the access points of the wireless network.

20 Claims, 8 Drawing Sheets

(56) References Cited

U.S. PATENT DOCUMENTS

| | | | |
|---|---|---|---|
| 2012/0327915 | A1 | 12/2012 | Kang et al. |
| 2013/0034003 | A1 | 2/2013 | Shapira |
| 2013/0070642 | A1* | 3/2013 | Kim et al. ............... 370/254 |
| 2013/0237265 | A1* | 9/2013 | Khojastepour et al. ....... 455/509 |
| 2013/0315211 | A1* | 11/2013 | Balan et al. ............... 370/336 |

OTHER PUBLICATIONS

Aryafar et al., "Design and Experimental Evaluation of Multi-User Beamforming in Wireless LANs," In Proceedings of the Sixteenth Annual International Conference on Mobile Computing and Networking, published Sep. 20, 2010, retrieved at <<http://www.ece.rice.edu/~nanand/Docs/sdma.pdf>> 12 pages.

Balan et al., "Achieving High Data Rates in a Distributed MIMO System," In Proceedings of the 18th Annual International Conference on Mobile Computing and Networking, published Aug. 22, 2012, retrieved at <<http://www-bcf.usc.edu/~kpsounis/Papers/distmimo.pdf>> 12 pages.

Balan et al., "AirSync: Enabling Distributed Multiuser MIMO with Full Spatial," Networking, IEEE/ACM Transactions, retrieved at <<http://ceng.usc.edu/assets/003/80856.pdf<< 15 pages.

Caire et al., "On the Achievable Throughput of a Multiantenna Gaussian Broadcast Channel," In Journal of IEEE Transactions on Information Theory, vol. 49, Issue 7, published Jul. 2003, retrieved at <<http://ieeexplore.ieee.org/stamp/stamp.jsp?tp=&arnumber=1207369>> 16 pages.

Dimic et al., "On Downlink Beamforming With Greedy User Selection: Performance Analysis and a Simple New Algorithm," In Journal of IEEE Transactions on Signal Processing, vol. 53, Issue 10, published Oct. 2005, retrieved at <<http://ieeexplore.ieee.org/stamp/stamp.jsp?tp=&arnumber=1510992>> 12 pages.

Dutta et al., "SMACK—A Smart Acknowledgment Scheme for Broadcast Messages in Wireless," In Proceedings of the ACM SIGCOMM Conference on Data Communication, published Aug. 17, 2009, retrieved at <<http://systems.cs.colorado.edu/~sahad/pubs/sahaSmackSigcomm09.pdf<< 12 pages.

Guillaud et al., "A Practical Method for wireless Channel Reciprocity Exploitation Through Relative Calibration," In Proceedings of the Eighth International Symposium on Signal Processing and Its Applications, published Aug. 28, 2005, retrieved at <<http://www.nt.tuwien.ac.at/uploads/media/isspa05_final.pdf>> 4 pages.

Hochwald et al., "Space-Time Multiple Access: Linear Growth in the Sum Rate," In Proceeding of 40th Annual Allerton Conference on Communications, Control and Computing, published Oct. 2002, retrieved at <<http://citeseerx.ist.psu.edu/viewdoc/download;jsessionid=7E19DB02B10DBC192EADB1EA2CCA22F6?doi=10.1.1.8.4704&rep=rep1&type=pdf>> 10 pages.

Jackson Labs Fury GPS Disciplined Oscillator, published May 6, 2007, retrieved at <<http://www.leapsecond.com/pages/fury/>> 18 pages.

Jungnickel et al., "Synchronization of Cooperative Base Stations," In Proceedings of Wireless Communication Systems, published Oct. 21, 2008, retrieved at <<http://www.easy-c.com/publications/iswcs_jungnickel2.pdf>> 6 pages.

Kay, "Fundamentals of Statistical Signal Processing, vol. I: Estimation Theory (v.1)," Prentice Hall, 1993, 304 pages.

Mudumbai et al., "Distributed Transmit Beamforming using Feedback Control," In Journals of IEEE Transactions on Information Theory, Mar. 18, 2006, retrieved at <<http://arxiv.org/pdf/cs.IT/0603072.pdf>> 17 pages.

Rahul et al., "JMB: Scaling Wireless Capacity with User Demands," In Proceedings of the ACM SIGCOMM Conference on Applications, Technologies, Architectures, and Protocols for Computer Communication, published Aug. 13, 2012, retrieved at <<http://conferences.sigcomm.org/sigcomm/2012/paper/sigcomm/p235.pdf>> 12 pages.

Rahul et al., "MegaMIMO: Scaling Wireless Capacity with User Demands," In Proceedings of SIGCOM, published Aug. 13, 2012, retrieved at <<http://people.csail.mit.edu/rahul/papers/megamimo-sigcomm2012.pdf.. 12 pages.

Shen et al., "Rate Adaptation for 802.11 Multiuser MIMO Networks," In Proceedings of the 18th Annual International Conference on Mobile Computing and Networking, published Aug. 22, 2012, retrieved at <<http://www.cs.washington.edu/homes/gshyam/Papers/turborate.pdf>> 11 pages.

Shepard et al., "Argos: Practical Many-Antenna Base Stations," In Proceedings of the 18th Annual International Conference on Mobile Computing and Networking, published Aug. 22, 2012, retrieved at <<http://networks.rice.edu/papers/argos.pdf>> 12 pages.

Tan et al., "Fine-grained Channel Access in Wireless LAN," In Proceedings of the ACM SIGCOMM Conference, published Aug. 30, 2010, retrieved at <<http://www.ccs.neu.edu/home/samanta/FineGrainedMAC.pdf>> 12 pages.

Tan et al., "SAM: Enabling Practical Spatial Multiple Access in Wireless LAN," In Proceedings of the 15th Annual International Conference on Mobile Computing and Networking, published Sep. 20, 2009, retrieved at <<http://www.cse.ust.hk/~liu/dezun/group_meeting/2009.9/Spatial_Multiple_Access_mobicom903-tan.pdf>> 12 pages.

Tan et al., "Sora: High Performance Software Radio Using General Purpose Multi-Core Processors," In Communications of the ACM, vol. 54, Issue 1, published Jan. 2011, retrieved at <<http://cseweb.ucsd.edu/~voelker/pubs/sora-nsdi09.pdf>> 16 pages.

The Sora Manual Version 1.5, In Technical Report (MSR-TR-2011-14), published Jul. 2011, retrieved at <<http://research.microsoft.com/pubs/144847/The%20Sora%20Manual-v1_5.pdf>> 121 pages.

Wang et al., "User Selection with Zero-Forcing Beamforming Achieves the Asymptotically Optimal Sum Rate," In Journal of IEEE transaction of Signal Processing, vol. 56, Issue 8, published Aug. 2008, retrieved at <<http://ieeexplore.ieee.org/stamp/stamp.jsp?tp=&arnumber=4567681>> 14 pages.

Yoo et al., "On the Optimality of Multiantenna Broadcast Scheduling using Zeroforcing Beamforming," In IEEE Journal on Selected Areas in Communications, vol. 24, Issue 3, published Mar. 2006, retrieved at <<http://ieeexplore.ieee.org/stamp/stamp.jsp?tp=&arnumber=1603708>> 14 pages.

Zhu et al., "Adapting Physical Carrier Sensing to Maximize Spatial Reuse in 802.11 Mesh Networks," In Journal of Wireless Communications & Mobile Computing—Special Issue: Emerging WLAN Apllications and Technologies, published Dec. 2004, retrieved at <<http://www.ee.washington.edukesearch/funlab/Publications/2004/CS_adapt_spatial_reuse.pdf>> 32 pages.

* cited by examiner

COOPERATIVE PHASE TRACKING IN DISTRIBUTED MULTIPLE-INPUT MULTIPLE-OUTPUT SYSTEM

BACKGROUND

With the popularity of mobile devices (such as smart phones and tablets, etc.), a growing number of applications rely heavily on wireless networks (e.g., WiFi network) to deliver content to the mobile devices. Such growth, however, is limited by the capacity of a wireless network, which in turn is primarily and significantly limited by signal interference. In some instances, a simple addition of new wireless access points (APs) or transmitters to the wireless network may not only fail to improve the capacity of the wireless network, but may actually reduce a network throughput of the wireless network due to competition and interference among the wireless access points (or transmitters) of the wireless network. MIMO (Multiple-Input-Multiple-Output) approach may be used to increase the capacity of the wireless network. However, this MIMO approach requires all wireless access points to transmit signals in synchronization by sharing a single clock or oscillator among the wireless access points. Otherwise, different frequency offsets and independent frequency instabilities may result if different or independent clocks are employed. Due to this dependence on a same clock or oscillator, an application of the MIMO approach is limited to only a single device or small-scale network of wireless access points.

SUMMARY

This summary introduces simplified concepts of cooperative phase tracking, which are further described below in the Detailed Description. This summary is not intended to identify essential features of the claimed subject matter, nor is it intended for use in limiting the scope of the claimed subject matter.

This application describes example embodiments of cooperative phase tracking. In one embodiment, a coordinator monitors phase drifts of symbols that are sent from a cluster of access points. The coordinator may send feedbacks related to the phase drifts of the symbols to the access points of the cluster. The feedback may include, for example, estimates of the phase drifts associated with the access points of the cluster. The access points may then compensate for the respective phase drifts for each symbol to be transmitted based on the feedback.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
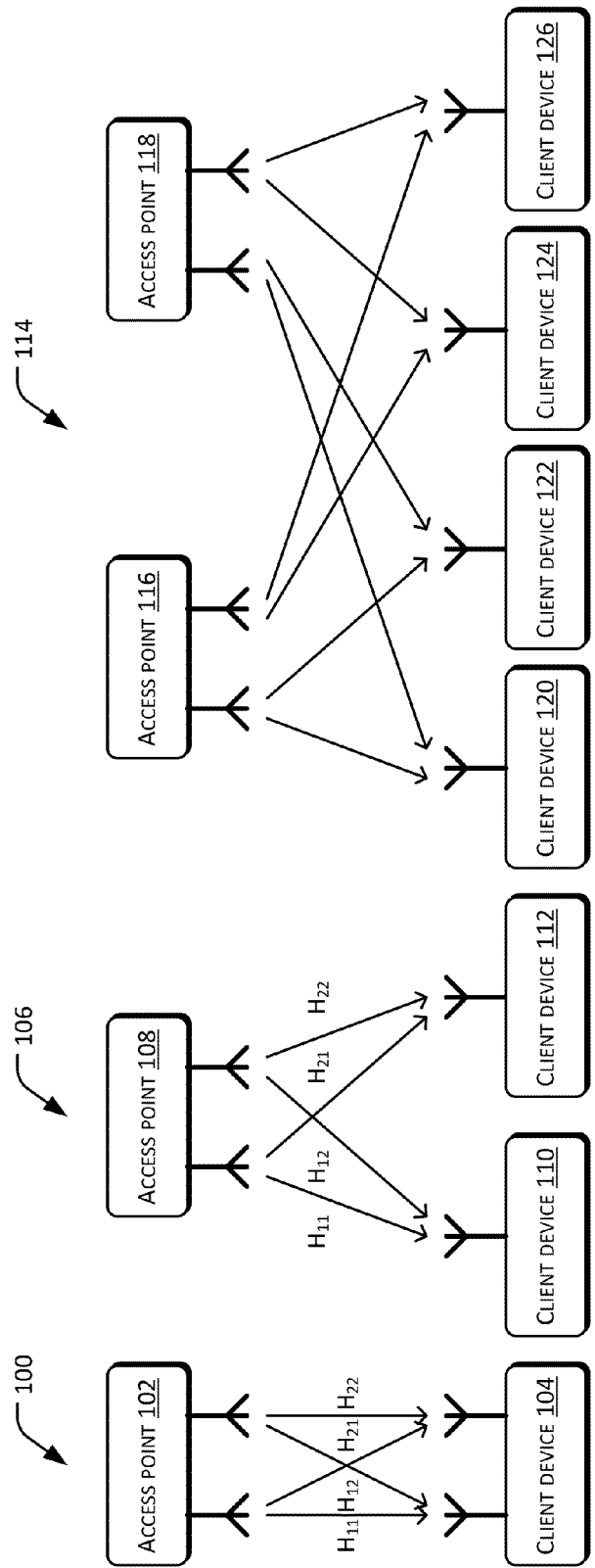
FIG. 1A illustrates an example setup of a Multiple-Input-Multiple-Output (MIMO) approach.
FIG. 1B illustrates an example setup of a Multi-User Beamforming (MUBF) approach.
FIG. 1C illustrates an example setup of a Cooperative Beamforming (COBF) approach.

As noted above, the demand for wireless traffic has been exponentially increasing recently. However, the capacity of a wireless network has failed to increase at the same pace as the rate of this explosive demand due to the negative impact of signal interferences on access points of the wireless network. Furthermore, existing wireless networks that use the MIMO approach rely on the usage of a same clock or oscillator for synchronizing the access points in order to avoid the need for a complicated signal interference avoidance scheme to account for different frequency offsets and frequency instabilities that would result from using different clocks or oscillators.

This disclosure describes a cooperative phase tracking system. The cooperative phase tracking system allows access points of a wireless network (e.g., a WiFi network) to use a clock or oscillator that may be different or independent from other access points of the same wireless network. As such, the cooperative phase tracking system eliminates the need to use using a same clock (or oscillator) among the access points and at the same time allows more access points to be installed for an associated wireless network to serve a larger area. Moreover, the cooperative phase tracking system may attribute intensive computations of relative phase drifts associated with the access points to a dedicated coordinator, thereby alleviating workload of the access points of the wireless network.

In one embodiment, the cooperative phase tracking system includes a set of cooperative access points (CoAPs) that may form a cluster and are connected with one another using a wired connection (such as a high-speed Ethernet, for example). In some embodiments, the cooperative phase tracking system further includes a controller. The controller may be configured to manage the cluster of cooperative access points and connect to an ingress router of a wireless network. In one embodiment, the controller may maintain a queue for downlink packets and include a database that stores channel state information between the cooperative access points and client devices that are associated with the cluster. The channel state information may include, but is not limited to, information that describes how a signal transmits from a cooperative access point to a client device, information that represents a combined effect of signal interaction with a transmission medium (such as scattering, fading and/or distance-based power decay, etc.) on the signal to be transmitted, etc.

Based on information included in the database, the controller may select a group of data packets from the downlink queue to be sent using a cooperative beamforming approach (which will be described in detail in subsequent sections). The controller may multi-cast data packets (or frames) included in the beamforming group to the cooperative access points in the cluster. Additionally, the controller may further send precoding information usable for the cooperative access points to pre-process the data frames prior to sending these data frames to respective client devices associated with the cluster. In one embodiment, the precoding information may include, for example, information of a precoding matrix and a normalization matrix that are used in estimation of relative phase rotation information and computation of precoded signals locally at the access points.

In some embodiments, the cooperative phase tracking system may further include a coordinator. The coordinator is configured to synchronize signal transmission times of the cooperative access points. Additionally, the coordinator may contend, compete or obtain a wireless medium on behalf of the cluster (i.e., the access points) and send out a (Clear to Send) CTS-to-Self frame upon obtaining the wireless medium. The coordinator sends this CTS-to-Self frame to reserve the wireless medium for subsequent beamforming transmission and also to synchronize signal transmissions of the cooperative access points.

In one embodiment, after a short-inter-frame-space (SIFS, i.e., a small time interval between a data frame and an acknowledgement thereof), the cooperative access points may start transmitting precoded data streams to the client devices associated with the beamforming group, with each of the client devices receiving a data stream specified or targeted therefor. During this transmission, the coordinator may continuously monitor the wireless medium and track a phase drift of each data symbol being sent in a data stream. In some embodiments, the coordinator may feedback estimates of phase drifts to the cooperative access points via the wired connection (e.g., the high-speed Ethernet). Based on these feedbacks, the cooperative access points may dynamically update or revise respective estimations of relative phase drifts and locally compensate respective signal phases in order to maintain a phase alignment with other cooperative access points. In one embodiment, upon receiving a data frame, a client device may send an acknowledgement to the coordinator, indicating a successful transmission of the data frame.

The described cooperative phase tracking system dedicates one or more coordinators to monitor and determine phase drifts associated with different cooperative access points of a wireless network due to usages of different or independent timing clocks or oscillators, and thus releases a size constraint (i.e., the number of cooperative access points without deteriorating signals received at client devices due to signal interferences) of the wireless network.

In some of the examples described herein, the cooperative phase tracking system employs different devices to perform a variety of functions (e.g., maintaining a queue for downlink packets, storing channel state information, contending (or competing or obtaining) a wireless medium for cooperative access points of a wireless network, monitoring and determining phase drifts associated with the cooperative access points, etc.). However, in other embodiments, these functions may be performed by one or more services. For example, in one embodiment, a storage service may maintain a queue for downlink packets and store channel state information, while a separate service may contend (or compete or obtain) a wireless medium for cooperative access points of a wireless network. Yet another service may monitor and determine phase drifts associated with the cooperative access points.

Furthermore, although in the examples described herein, the cooperative phase tracking system may be implemented as software and/or hardware installed in a plurality of devices, in other embodiments, the cooperative phase tracking system may be implemented in a single device or as a service provided in one or more servers over a network and/or in a cloud computing architecture.

The application describes multiple and varied implementations and embodiments. The following section describes an example framework that is suitable for practicing various implementations. Next, the application describes example systems, devices, and processes for implementing a cooperative phase tracking system.

Exemplary Mathematical Framework

Prior to describing the example systems, devices, and processes for implementing the cooperative phase tracking system, an exemplary mathematical framework for cooperative phase tracking is first described herein. The exemplary framework is meant to lay a foundation for describing the cooperative phase system and should not be construed as a limitation of the present disclosure.

In one embodiment, a MIMO (i.e., multiple input and multiple output) approach may be used to improve wireless communication performance by spatial multiplexing, which sends multiple data streams to client devices simultaneously. FIG. 1A illustrates an example setup 100 of MIMO where an access point (AP) 102 and a client device 104 each have two antennas. In one embodiment, the access point 102 may use both antennas to send two (spatial) data streams to the client device 104 simultaneously. Channel coefficients from the antennas of the access point 102 to the antennas of the client device 104 may be represented as:

$$H = \begin{pmatrix} h_{11} & h_{12} \\ h_{21} & h_{22} \end{pmatrix} \quad (1)$$

where $h_{ij}$ represents a channel coefficient between an ith antenna of the access point 102 and a jth antenna of the client device 104.

If $s=[s_1,s_2]^T$ represents data symbols from the two data streams, a received signal at the client device 104 may be expressed as:

$$y=Hs \quad (2)$$

where y represents data symbols received at the two antennas of the client device 104.

By solving the above Equation (2), the client device 104 may obtain or decode the two data symbols (i.e., $s_1$, $s_2$).

Since MIMO has both ends (i.e., the access point 102 and the client device 104) to have multiple antennas, a multiplexing gain may be bounded by a minimum number of transmitting (i.e., at the access point 102) and receiving (i.e., at the client device 104) antennas.

To fully utilize antennas of an access point, a MUBF (multi-user beamforming) approach may be used to allow the access point to send multiple data frames to different client devices concurrently. In the context of the MUBF approach, the term "user" refers to a client device. FIG. 1B illustrates an example setup 106 of the MUBF approach. The example setup 106 includes an access point 108, a first client device 110 and a second client device 112. In this example, each client device (i.e., the first client device 110 and the second client device 112) only includes a single antenna and cannot directly decode all frames based on Equation (1). In this scenario, the MUBF approach controls signal transmissions on both antennas of the access point 108 to create desirable interference at each signal receiver (i.e., the first client device 110 and the second client device 112). Specifically, each antenna of the access points 118 may transmit a linear combination of s, e.g., x=Ws, such that a resulting channel matrix (i.e., H in Equation (1)) is diagonal. Mathematically, a received signal at a client device is:

$$y = HWs = \begin{pmatrix} d_1 & 0 \\ 0 & d_2 \end{pmatrix} s \quad (3)$$

where y represents a received signal at a client device, H represents channel coefficients between the access point and the client device, and s represents signals transmitted from the access point.

In one embodiment, the matrix W may be a N×N matrix and is referred to as a precoding matrix or simply a precoder. In this MUBF approach, each client device receives data symbols that are targeted to the respective client device while interference is canceled out. If H is a square matrix, the precoding matrix is found to be $W=H^{-1}$. In some practical situations, a Frobenius norm (i.e., a root of the sum of squared norm of all elements in a matrix) of $H^{-1}$ may be very larger if H is poorly conditioned. A matrix is said to be poorly conditioned or ill-conditioned if a condition number of the matrix is large and a computation of an inverse of such matrix is prone to large numerical errors. In this scenario, the precoded signal Ws may be normalized in order to prevent a transmission power thereof from exceeding a radio hardware limit of the antenna. In one embodiment, the precoded signal may be multiplied by another diagonal matrix to normalize the transmission power thereof as represented by the following equation:

$$y = HW\Gamma s \quad (4)$$

In one embodiment, a value of $\Gamma$ may be chosen to control a total emitted signal power (for example, controlling the total emitted signal power within a certain power level or within a threshold of error of a predefined power level, etc.):

$$\Gamma = \gamma I = \frac{1}{\|H^{-1}s\|} I \quad (5)$$

From Equation (5), a normalization process reduces a signal strength by a factor of $\gamma$, which in turns depends on $H^{-1}$.

FIG. 1C illustrates an example setup 114 of a COBF (cooperative beamforming) approach. In this example, two access points 116 and 118, each with two antennas, cooperatively serve four single-antenna client devices 120-126. The COBF approach differs from the MUBF approach in that some or all of the access points in the COBF are driven by different or independent local clocks or oscillators, which may run freely or independently at slightly different frequencies. Because of these different or independent local clocks or oscillators, frequency offsets among the local clocks or oscillators (and hence the access points) are allowed to exist. By way of example and not limitation, given a simpler case that two single-antenna access points cooperatively transmit data to two client devices using the COBF approach, a channel matrix thereof (which is constant during a frame transmission in the MUBF approach) changes over time as represented by:

$$H(t) = \begin{pmatrix} h_{11} e^{j(\omega_{T1}-\omega_{R1})t} & h_{12} e^{j(\omega_{T2}-\omega_{R1})t} \\ h_{21} e^{j(\omega_{T1}-\omega_{R2})t} & h_{22} e^{j(\omega_{T2}-\omega_{R2})t} \end{pmatrix} \quad (6)$$

$$= \Lambda_1(t) \begin{pmatrix} h_{11} & h_{12} \\ h_{21} & h_{22} \end{pmatrix} \Lambda_2(t)$$

where $\omega_{Ti}$ is a phase rotation speed associated with an ith transmitter (i.e., an ith access point),
$\omega_{Rj}$ is a phase rotation speed associated with a jth receiver (i.e., a jth client device)

$$\Lambda_1(t) = \begin{pmatrix} e^{-j\omega_{R1}t} & 0 \\ 0 & e^{-j\omega_{R2}t} \end{pmatrix} \text{ and } \Lambda_2(t) = \begin{pmatrix} e^{j\omega_{T1}t} & 0 \\ 0 & e^{j\omega_{T2}t} \end{pmatrix}$$

are two diagonal matrices; and
$h_{ij}$ is channel coefficients measured or obtained at time t=0.

In this example, $\Lambda_1$ may be compensated using equalization at the receiver side (i.e., the client device) and therefore does not impact on the beamforming. On the other hand, $\Lambda_2$ may be compensated at the transmitter side (i.e., the access point) using precoding or a self-interference may result at each receiver (i.e., the client device in this example). For example, if the precoding matrix that is derived in Equation (4) with COBF is applied, a received signal at a client device may be represented as:

$$y = H(t)W\Gamma s = \Lambda_1(t)(H\Lambda_2(t)H^{-1})\Gamma s \quad (7)$$

As can be seen from Equation (7), $(H\Lambda_2(t)H^{-1})$ is no longer a diagonal matrix and hence beamforming fails. To compensate $\Lambda_1(t)$, $\Lambda_2^{-1}(t)$ is multiplied after the precoder W. Specifically, a phase difference between the transmitters (i.e., the access points) for each symbol is estimated.

Furthermore, since a signal or data signal (or frame) may be transmitted at a very high frequency (such as 2.4 GHz), instead of estimating each $\omega_i$ directly, in one embodiment, a frequency associated with an access point is used as a reference and $\Lambda_2$ is rewritten as:

$$\Lambda_2(t) = e^{j\omega_{ref}t} \begin{pmatrix} e^{j(\omega_{T1}-\omega_{ref})t} & 0 \\ 0 & e^{j(\omega_{T2}-\omega_{ref})t} \end{pmatrix} \quad (8)$$

Since $e^{j\omega_{ref}t}$ is a scalar factor, this factor does not affect the precoding and may be compensated at the receiver side. In other words, only the frequency offset (CFO) between an access point and a reference access point may be estimated. A phase difference may be computed by $\Delta\phi=\Delta\omega t$, where t is an elapsed time from the time when the channel coefficients $h_{ij}$ are obtained.

In one embodiment, access points may align respective signal phases to avoid self-induced interference as described above. Specifically, a dedicated coordinator (which may be an access point) is employed to monitor cooperative transmissions of cooperative access points continuously, and to compute phase drifts of each data symbol and feedback estimates of the phase drifts to the cooperative access points, for example, via a wired connection such as an Ethernet connection. Based on the feedback, the access points may dynamically adjust respective signal phases to ensure phase alignment among one another.

Exemplary Environment

Figure 2:
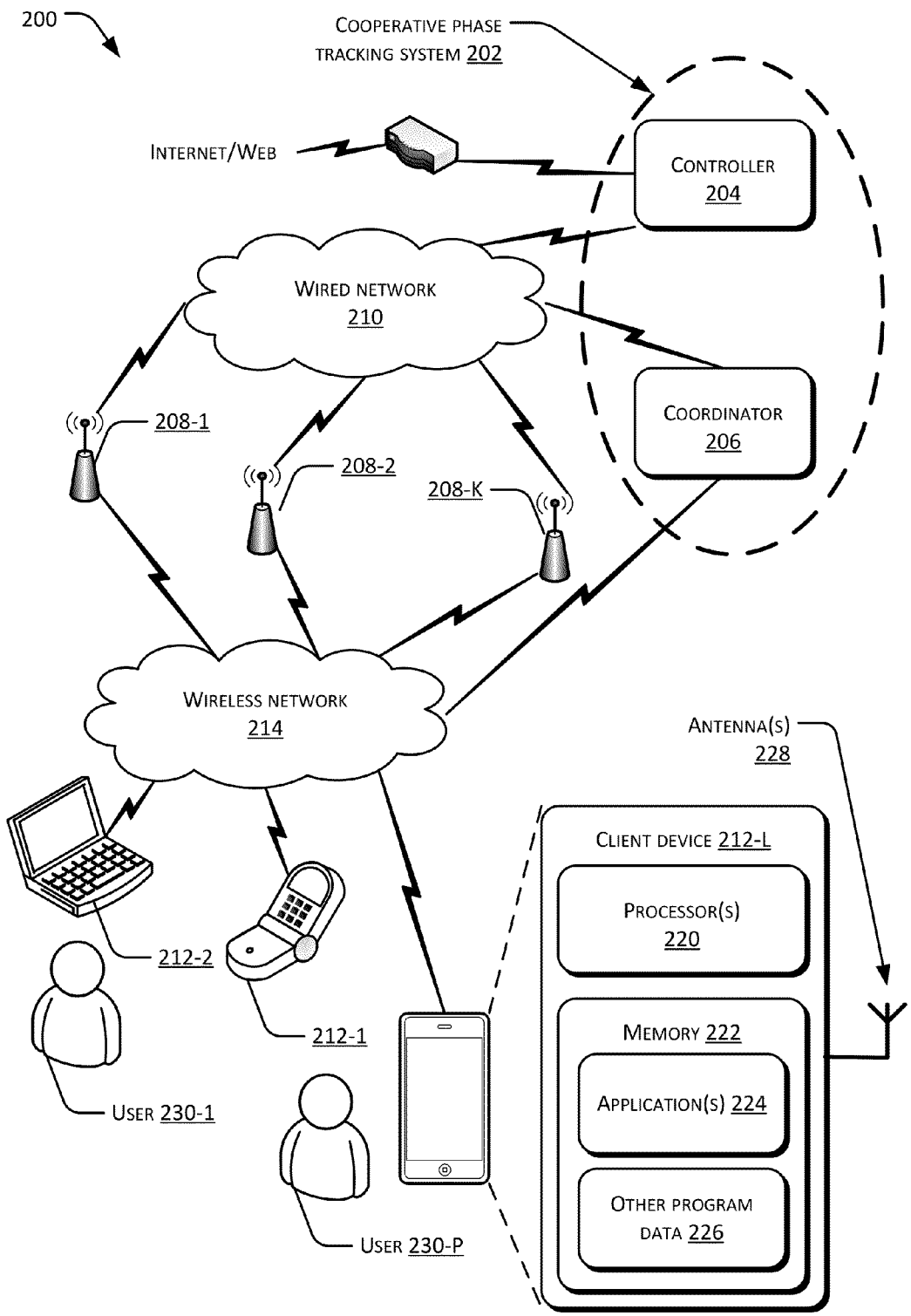
FIG. 2 illustrates an example environment of a cooperative phase tracking system including one or more controllers.

FIG. 2 illustrates an exemplary environment 200 usable to implement a cooperative phase tracking system. The environment 200 may include a cooperative phase tracking system 202. The cooperative phase tracking system 202 may include a controller 204 and a coordinator 206. In one embodiment, the environment 200 may further include a plurality of cooperative access points 208-1, 208-2, . . . , 208-K (which are collectively referred to as cooperative access points 208). K is an integer greater than or equal to one. In this example, the controller 204, the coordinator 206 and the plurality of cooperative access points 208 are connected to one another and communicate data with one another via a wired network 210. In some embodiments, the environment 200 may further include a plurality of client devices 212-1, 212-2, . . . , 212-L (which are collectively referred to as client devices 212), where L is an integer greater than or equal to one. The client devices 212 may communicate data with the cooperative access points 208, the coordinator 206 and/or the controller 204 via a wireless network 214. In one embodiment, the environment 200 may further include an ingress router 216 through which the controller 204 is connected to the Internet or the Web. In other examples, the environment 200 or the cooperative phase tracking system 202 may include additional controllers and/or coordinators.

Although in this example, the controller 204, the coordinator 206 and the plurality of cooperative access points 208 are described to be connected to one another and communicate data with one another via the wired network 210, in some embodiments, the controller 204, the coordinator 206 and the plurality of cooperative access points 208 are described to be connected to one another and communicate data with one another via a high-speed and/or secure network which includes another wireless network or a combination of a wireless network and a wired network.

In this example, the cooperative phase tracking system 202 is described to be distributed among multiple devices (e.g., the controller 204 and the coordinator 206). In some embodiments, however, the functions of the cooperative phase tracking system 202 may be performed by a single device or entity, for example, a dedicated access point 208. Additionally or alternatively, some or all of the functions of the cooperative phase tracking system 202 may be included in one or more entities other than the controller 204 and/or the coordinator 206. For example, some or all of the functions of the cooperative phase tracking system 202 may be included and distributed in one or more cooperative access points 208. Additionally or alternatively, some or all of the functions of the cooperative phase tracking system 202 may be included and distributed among one or more servers 218 that are connected to the cooperative access points 208 via the wired network 210. For example, the one or more servers 218 may include part of the functions of the cooperative phase tracking system 202 while other functions of the cooperative phase tracking system 202 may be included in the controller 204, the coordinator 206 and/or one or more cooperative access points 208. Furthermore, in some embodiments, some or all the functions of the cooperative phase tracking system 202 may be included in a cloud computing system or architecture.

The client device 212 (as represented by the client device 212-L) may be implemented as any of a variety of conventional computing devices that include an antenna. Examples of the conventional computing devices may include, but are not limited to, a mainframe computer, a server, a notebook or portable computer, a router, a handheld device, a netbook, an Internet appliance, a tablet or slate computer, a mobile device (e.g., a mobile phone, a personal digital assistant, a smart phone, etc.), a game console, a set-top box, etc. or a combination thereof.

The wired network 210 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). For example, the wired network 210 may include a network connected with a wired connection such as high-speed Ethernet. Furthermore, the wired connection may include an electrical carrier or connection (such a communication cable, etc.) and/or an optical carrier or connection (such as an optical fiber connection, etc.)

The wireless network 214 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). The wireless network 214 may include, for example, a WiFi network, other radio frequency networks (e.g., Bluetooth®, Zigbee, etc.), etc.

In one embodiment, the client device 212 may include one or more processors 220 coupled to memory 222. The memory 222 may include one or more applications or services 224 (e.g., web applications or services, video applications or services, etc.) and other program data 226. The memory 222 may be coupled to, associated with, and/or accessible to other devices, such as network servers, routers, and/or the other servers 218. In one embodiment, the client device 212 further includes one or more antennas 228.

In one embodiment, a plurality of users 230-1, . . . , 230-P (collectively referred to as users 230) may want to receive data (e.g., multimedia content, etc.) using the plurality of client devices 212, where P is an integer greater than or equal to one. The cooperative phase tracking system 202 may coordinate the cooperative access points and transmit the data to the plurality of client devices 212 to eliminate or alleviate interference among signals transmitted from the cooperative access points.

Exemplary Controller

Figure 3:
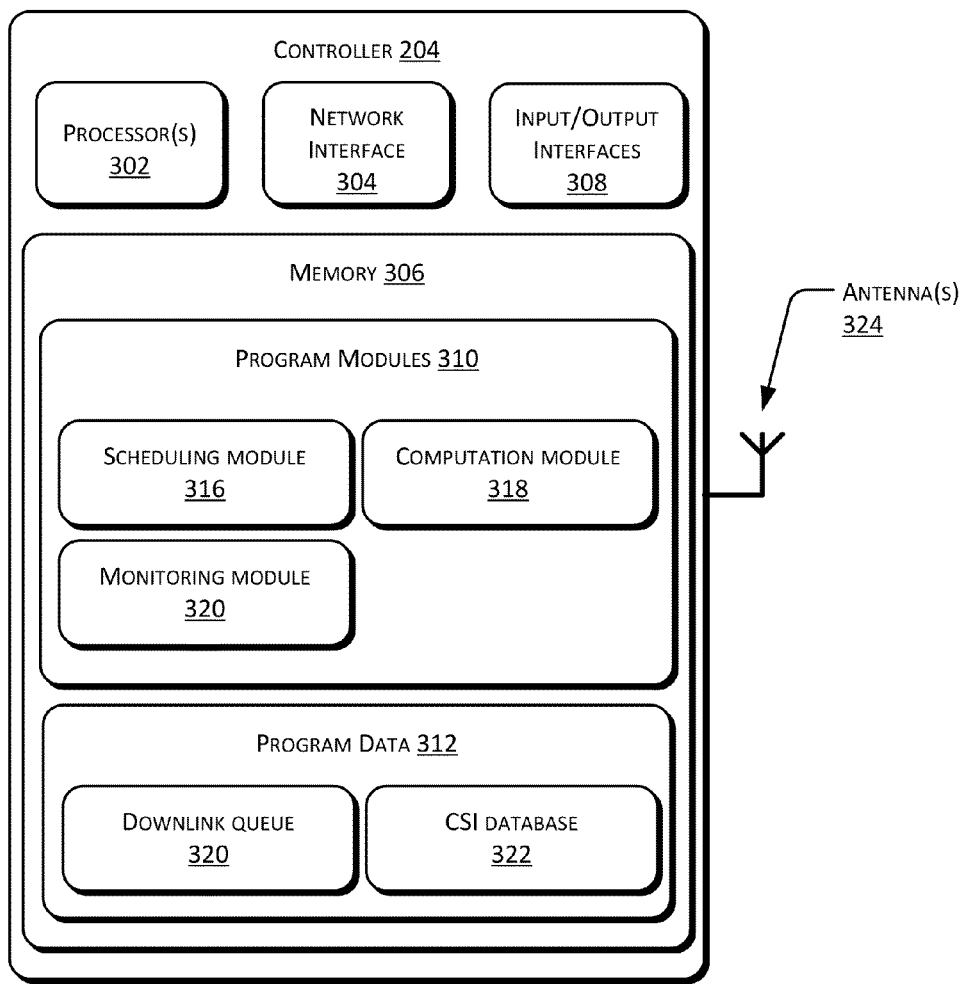
FIG. 3 illustrates an example controller of FIG. 2 in more detail.

FIG. 3 illustrates the example controller 204 in more detail. In one embodiment, the controller 204 includes, but is not limited to, one or more processors 302, a network interface 304, memory 306, and an input/output interface 308. The processor(s) 302 is configured to execute instructions received from the network interface 304, received from the input/output interface 308, and/or stored in the memory 306.

The memory 306 may include volatile memory, such as Random Access Memory (RAM) and/or non-volatile memory, such as read only memory (ROM) or flash RAM. The memory 306 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other nontransmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 306 may include program modules 310 and program data 312. In one embodiment, the controller 204 may include a downlink queue 314, a scheduling module 316, a computation module 318, a monitoring module 320 and a CSI database 322. In some embodiments, the controller 204 may further include one or more antennas 324.

Exemplary Coordinator

Figure 4:
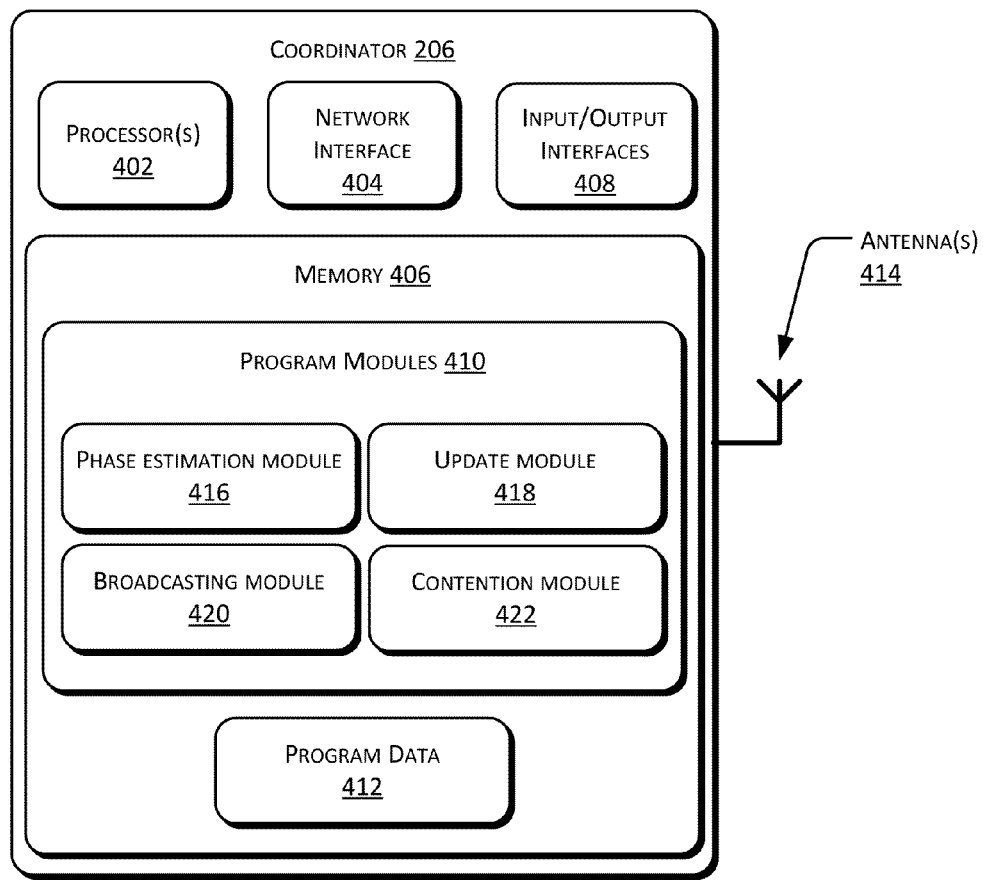
FIG. 4 illustrates an example coordinator of FIG. 2 in more detail.

FIG. 4 illustrates the example coordinator 206 in more detail. In one embodiment, the coordinator 206 includes, but is not limited to, one or more processors 402, a network interface 404, memory 406, and an input/output interface 408. The processor(s) 402 is configured to execute instructions received from the network interface 404, received from the input/output interface 408, and/or stored in the memory 406. In one embodiment, the memory 406 may include computer-readable media.

The memory 406 may include program modules 410 and program data 412. In one embodiment, the coordinator 206 may include one or more antennas 414, a phase estimation module 416, an update module 418, a broadcasting module 420 and a contention module 422.

Exemplary Cooperative Access Point

Figure 5:
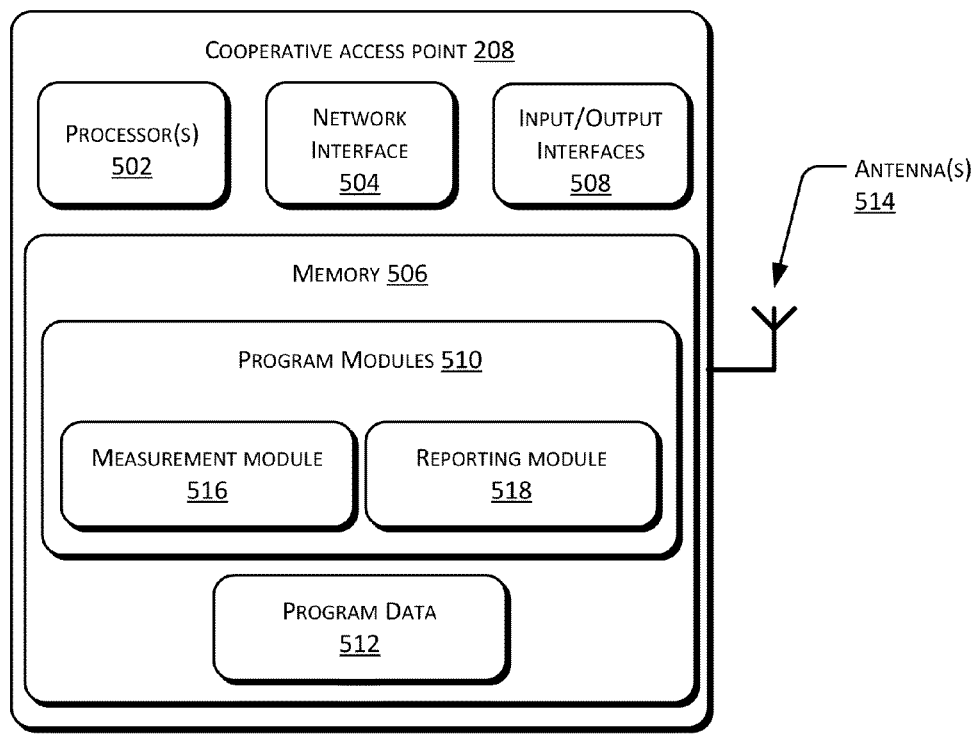
FIG. 5 illustrates an example cooperative access point of FIG. 2 in more detail

FIG. 5 illustrates the example cooperative access point 208 in more detail. In one embodiment, the cooperative access point 208 includes, but is not limited to, one or more processors 502, a network interface 504, memory 506, and an input/output interface 508. The processor(s) 502 is configured to execute instructions received from the network interface 504, received from the input/output interface 508, and/or stored in the memory 506. In one embodiment, the memory 506 may include computer-readable media.

The memory 506 may include program modules 510 and program data 512. In one embodiment, the cooperative access point 208 may include one or more antennas 514, a measurement module 516 and a reporting module 518.

Example Cooperative Phase Tracking

Without loss of generality, beamforming transmission is described to begin at time t=0, and the channel matrix H(0) is known. Also, for the sake of description, in this example, the coordinator 206, the cooperative access points 208 and the client devices 212 each are described to have a single antenna. However, the present disclosure is not limited thereto and is applicable and/or extendable to scenarios where the coordinator 206, the cooperative access points 208 and/or the client devices 212 include one or more antennas. Furthermore, due to measurement noise and short-term frequency instability of oscillators (such as crystal oscillators), an estimation of $\Delta\omega_i=\omega_i-\omega_{ref}$ may not be accurate enough for precise phase alignment during an entire frame transmission. Therefore, in this cooperative tracking, a feedback mechanism that allows each cooperative access point 208 to continuously track respective relative phase drift is developed.

In this example, the coordinator 206 is used to monitor signal transmissions of cooperative access points 208 and measure phase drifts for each symbol transmitted by the cooperative access points 208. The coordinator 206 may estimate the phase drifts for each symbol and multicast the estimated phase drifts to the cooperative access points 208 in real time or substantially in real time via the wired network 210. Each cooperative access point 208 may then dynamically update respective $\Lambda_2(t)$ estimation and ensure phase alignment for later symbols to be transmitted based on this $\Lambda_2(t)$ estimation.

In one embodiment, the coordinator 206 may know (exact) content of each precoded data stream transmitted by the cooperative access points 208. For example, the coordinator 206 may know the content of each precoded data stream from the controller 204 which selects a group of packets from the downlink queue 314 and multicasts the selected group of packets to the cooperative access points 208 via the wired network 210. Based on this knowledge of the content of each precoded data stream, the coordinator 206 may obtain a phase drift associated with each cooperative access point 208 as described hereinafter.

Given that $s_{i,j}^k$ denotes an ith OFDM (orthogonal frequency-division multiplexing) symbol on a jth subcarrier for kth data stream, $s_{i,j}=[s_{i,j}^1, s_{i,j}^2, \ldots, s_{i,j}^K]^T$ denotes a vector of concurrent data symbols. A precoded symbol on a mth cooperative access point may be represented as $x_{i,j}^m=w_m\gamma_m s_{i,j}$, where $w_m$ and $\gamma_m$ are respective mth row vector of the precoding matrix W and the normalization matrix $\Gamma$. In one embodiment, a signal received at an antenna 414 of the coordinator 206 may be written as:

$$y_{i,j}=(g_j \circ x_{i,j})^T \Phi_i \quad (9)$$

where $g_j=[g_j^1, g_j^2, \ldots, g_j^M]^T$ is a channel vector between the cooperative access points 208 and the coordinator 206, $x_{i,j}=[x_{i,j}^1, x_{i,j}^2, \ldots, x_{i,j}^M]^T$ is a vector of precoded symbols, $$\Phi_i = [e^{j\Phi_i^1}, e^{j\Phi_i^2}, \ldots e^{j\Phi_i^M}]$$

is a vector of relative signal phases between the cooperative access points 208 and the coordinator 206, and "$\circ$" is an operator of dot-production between two vectors.

In one embodiment, the coordinator 206 knows $x_{i,j}$ and may measure or obtain $g_i$ before a transmission starts. Additionally, in some embodiments, the phase estimation module 416 may estimate or measure a relative phase of each OFDM symbol. By way of example and not limitation, the phase estimation module 416 may employ a Kalman filtering to estimate the relative phase of each OFDM symbol. For example, given a matrix $B_i$, which jth column $b_j=(g_j \circ x_{i,j})$, the phase estimation module 416 may employ a measurement equation, which is represented as:

$$y_i=B_i^T\Phi_i+n_i \quad (10)$$

where $y_i=[y_{i,1}, y_{i,2}, \ldots, y_{i,N_c}]^T$ is a vector of received ith OFDM symbol, $n_i$ is a measurement noise vector.

In one embodiment, a Kalman state equation may be represented as:

$$\Phi_i=\Delta\Phi_{i-1}+v_i \quad (11)$$

where $\Delta=\text{diag}([e^{j\Delta_1}, e^{j\Delta_2}, \ldots, e^{j\Delta_M}])$ is a distortion matrix that is caused by residual frequency offsets over a single OFDM symbol, and $v_i$ represents state noise which is used to account for an oscillator instability.

Table 1 outlines an example Kalman filtering that may be used by the phase estimation module 416. In order to start a phase tracking process, the phase estimation module 416 first determines an initial value of $B_1$. Since the precoded symbols $x_{i,j}^m$ are known to the coordinator 206 (and hence the phase estimation module 416), the phase estimation module 416 may only determine information associated with channels between the coordinator 206 and the cooperative access points 208, i.e., $g_j^m$. In one embodiment, the coordinator 206

(or the update module 418) may send a CTS-to-Self frame, and the cooperative access points 208 may then measure information of reverse channels from the CTS-to-Self frame. The cooperative access points 208 may then feedback the measured channel state information to the coordinator 206 (or the update module 418), which deduces forward channel coefficients through channel reciprocity. In some embodiments, the phase estimation module 416 may measure or estimate covariance matrices of the noise vectors $n_i$ and $v_i$ in advance as parameters thereof are quite stable.

TABLE 1

Example Kalman phase tracking

| | |
|---|---|
| Input: | (1) Channel information between the coordinator 206 and the cooperative access points, $\{g_i\}$; |
| | (2) Precoded symbols, $\{x_{i,j}\}$; |
| | (3) Covariance matrix $V_1$ of $n_i$; |
| | (4) Covariance matrix $V_2$ of $v_i$; |
| | (5) $\Delta = I$, $P_1^- = 0$, $\hat{\Phi}_1^- = 1$. |
| Output: | d-step prediction of a phase vector $\hat{\Phi}_{i+d}^-$ at each symbol i |
| 1: | for each OFDM symbol i |
| 2: | $B_i = [g_1 \circ x_{i,1}, g_1 \circ x_{i,2}, \ldots, g_1 \circ x_{i,M}]$ |
| 3: | Measurement update: |
| 4: | $K_i = P_i^- B_i (B_i^T P_i^- B_i + V_1)^{-1}$ |
| 5: | $\hat{\Phi}_i = \hat{\Phi}_i^- + K_i(y_i - B_i^T \hat{\Phi}_i^-)$ |
| 6: | $P_i = (I - K_i B_i^T) P_i^-$ |
| 7: | Time update: |
| 8: | $\hat{\Phi}_{i+1}^- = \Delta \hat{\Phi}_i$ |
| 9: | $P_{i+1}^- = P_i + V_2$ |
| 10: | CFO correction: |
| 11: | $\angle\Delta = \dfrac{i\angle\Delta + \angle(\hat{\Phi}_i / \hat{\Phi}_{i-1})}{i+1}$ |
| 12: | d-step prediction: |
| 13: | $\hat{\Phi}_{i+d}^- = d\Delta \hat{\Phi}_i$ |
| 14: | end for |

In one embodiment, given a total number of subcarriers $N_c$ (which may include, for example, data and pilot subcarriers) in a single OFDM symbol, at most $N_c$ independent linear equations may exist. Specifically, the coordinator 206 may track at most $N_c$ cooperative access points 208 simultaneously at one time. If more cooperative access points 208 are to be supported, the coordinator 206 may include multiple antennas 414, which produce additional independent linear equations for Kalman filtering to track signal phases for a larger number of cooperative access points.

In some embodiments, the coordinator 206 (or the broadcasting module 420) may broadcast current or most recent estimates of relative phase drifts $\hat{\Phi}_{i+d}^-$ to the cooperative access points 208 after a criterion is met. Examples of the criterion may include, but are not limited to, a predetermined number of L symbols, a predetermined time interval, etc. In one embodiment, the coordinator 206 (or the broadcasting module 420 may broadcast the estimates of the relative phase drifts to the cooperative access points via the wired network 210 (such as the Ethernet). Additionally, in some embodiments, the phase estimation module 416 may include a prediction step (as described in Table 1) which is designed to tolerate a delay caused in the wired network.

In response to receiving these estimates of the relative phase drifts, each cooperative access point 208 may compensate respective phase drift for each symbol to be transmitted based on these estimates. By way of example and not limitation, a mth cooperative access point 208 may multiple precoded symbols of the i+dth OFDM symbol with a conjugate of the mth element of $\hat{\Phi}_{i+d}^-$ to correct respective phases before transmission.

Example Incremental Channel State Information Estimation

In the foregoing embodiments, the channel matrix H at the beginning of the COBF transmission is described to be known. In one embodiment, the cooperative phase tracking system 202 may use an incremental CSI estimation approach to obtain information of this channel matrix without explicitly measuring the channel matrix prior to each COBF transmission. Additionally, each client device 212 may measure an associated wireless channel independent at a time instance different from other client devices 212. For example, a client device 212 may measure an associated wireless channel independent at a time instance different from other client devices 212 provided that the client device 212 keeps channel state information associated therewith to be updated within a channel coherence time. By way of example and not limitation, the controller 204 (or the scheduling module 316) may schedule a beamforming group for signal transmission, the controller 204 (or the scheduling module 316) may combine channel state information (associated with client devices 212 included in the beamforming group) that is measured at different time instances into an equivalent channel matrix as if the channel state information associated with the client devices 212 were measured at a same time. In one embodiment, the controller 204 (or the computation module 318) may compute or obtain a proper or suitable precoder (or precoding matrix) for the beamforming group based on this combined channel matrix and thus remove a need of per-frame channel measurement. In other words, the incremental CSI estimation approach includes only a single frame exchange between the coordinator 206 and a client device 212.

In one embodiment, the controller 204 (or the monitoring module 320) may determine or detect a status of channel state information of a client device 212 on a regular basis. Additionally or alternatively, the controller 204 (or the monitoring module 320) may determine or detect the status of the channel state information of the client device 212 after a predetermined number of transmissions. Additionally or alternatively, the controller 204 (or the monitoring module 320) may determine or detect the status of the channel state information of the client device 212 prior to a signal transmission that includes the client device 212 as a receiver. In one embodiment, the controller 204 (or the monitoring module 320) may determine whether the channel state information of the client device 212 is stale or obsolete. For example, the controller 204 (or the monitoring module 320) may determine whether a timestamp associated with the channel state information of the client device 212 is older than a channel coherence time.

In one embodiment, in response to determining or detecting that the channel state information of the client device 212 is stale or obsolete (e.g., the timestamp associated with the channel state information of the client device 212 is older than the channel coherence time), the controller 204 (or the monitoring module 320) may send an instruction or request to the coordinator 206 to instruct or request the coordinator 206 to send a channel measurement (CM) frame to the client device 212. In response to receiving the CM frame from the coordinator 206, the client device 212 may reply the coordinator 206 by sending an acknowledgement (ACK) frame back to the coordinator 206.

Additionally, in some embodiments, each cooperative access point 208 may overhear this frame exchange between the coordinator 206 and the client device 212. In one embodiment, each cooperative access point 208 (or respective measurement module 516) may use preambles of both the CM frame and the ACK frame to estimate or measure $h_{ref,n}$, channel property from the coordinator 206 to the cooperative access point 208 and $g_{m,n}$, a uplink channel property between the respective cooperative access point 208 and the client device 212. In some embodiments, each cooperative access point 208 may further determine a phase of $h_{ref,n}$, channel property from the coordinator 206 to the cooperative access point 208, which may be denoted by $\phi_n(t)$, a "phase-stamp" of the channel measurement associated with the client device 212 (e.g., the mth client device) at a time instance t. Upon estimating or measuring respective uplink channel measurement (g) and the phase-stamp ($\phi$), each cooperative access point 208 (or respective reporting module 518) may report respective uplink channel measurement (g) and the phase-stamp ($\phi$) to the controller 204 (or the monitoring module 320).

Upon receiving the uplink channel measurements and the phase-stamps from the cooperative access points 208, the controller 204 may store these plink channel measurements and phase-stamps into a CSI database 322. When the controller 204 (or the scheduling module 316) selects a beamforming group for signal transmission, the controller 204 (or the computation module 318) may generates an equivalent channel matrix $\hat{H}$. For example, the controller 204 (or the scheduling module 316) may first pick up a client device 212 associated with which channel is measured lastly, i.e., having the most recent timestamp $t_b$. If $\Phi(t)=[\phi_1(t_b), \phi_2(t_b), \ldots, \phi_N(t_b)]$ is a phase-stamp vector at time $t_b$, each element of the equivalent channel matrix $\hat{H}$ may be represented by:

$$h_{m,n}(t_b) = a_{m,n} g_{m,n}(t_m) e^{j(\phi_n(t_m) - \phi_n(t_b))} \qquad (12)$$

where $g_{m,n}(t_m)$ is an uplink channel measured for the mth client device 212 at time $t_m$, and $\phi_n(t_m)$ is a phase-stamp measured by the nth cooperative access point 208 at time $t_m$.

In other words, the mth row of the equivalent channel matrix $\hat{H}$ is composed by channel factors $g_m$, measured by the mth client device 212 at time $t_m$, with a phase rotation corresponding to a difference between two phase-stamps at time $t_b$ and $t_m$. Additionally, the controller 204 (or the computation module 318) may further compute a precoder W based on equivalent channel matrix $\hat{H}$ and distributes the precoder W and $\Phi(t_b)$ to each cooperative access point 208.

In one embodiment, after the coordinator 206 (or the contention module 422) wins a wireless medium for signal transmission, e.g., at time $t_s$, the coordinator 206 (or the scheduling module 316) may send out a CTS-to-Self frame to synchronize each cooperative access point 208 of the cluster. In this case, each cooperative access point 208 may measure the phase-stamp $\Phi(t_b)$ from this CTS-to-Self frame. Additionally, in some embodiments, each cooperative access point 208 may construct an initial estimation of $\Lambda_2(t_s) = \Phi^*(t_s)\Phi(t_b)$, and compensate a relative phase rotation among the cooperative access points 208 during the time period of $(t_s-t_b)$.

Additionally, in some embodiments, the coordinator 206 (or the computation module 318) may not (explicitly) calibrate each $a_{m,n}$. In one embodiment, the coordinator 206 (or the computation module 318) may reduce the number of reciprocity calibrations based on a relative calibration method. Details of the relative calibration method can be found at M. Guillaud, D. T. M. Slock and R. Knopp, "A Practical Method for Wireless Channel Reciprocity Exploitation through Relative Calibration", *IEEE ISSPA*, 2005. Specifically, the coordinator 206 (or the computation module 318) may obtain $$a_{m,n} = \frac{t_n \cdot r_n}{t_m \cdot r_m},$$

where $t_n$ and $r_n$ are linear filters corresponding to radio transmitting and receiving chain of node n respectively. Furthermore, the coordinator 206 (or the computation module 318) may derive $a_{m,n} = a_{m,ref} a_{ref,n}$, where $a_{m,ref}$ and $a_{ref,n}$ are reciprocity factors between the coordinator 206 and the mth client device 212 and the nth cooperative access point 208 respectively. In one embodiment, the coordinator 206 (or the computation module 318) may calibrate the factor $a_{ref,n}$ between the nth cooperative access point 208 and the coordinator 206 periodically. Furthermore, for each client device 212, the coordinator 206 (or the computation module 318) may calibrate $a_{m,ref}$ at an association time. Specifically, after a client device 212 successfully associates to the cluster of the cooperative access points 208, the client device 212 may report associated channel state information to the coordinator 206 for computation of the factor $a_{m,ref}$.

In one embodiment, due to different or heterogeneous propagation delays and/or transmission delays of data transmitted between the coordinator 206 and the cooperative access points 208, the coordinator 206 may further calibrate these delays and notify the cooperative access points to compensate these delays accordingly. This may help to avoid signals that are transmitted by the cooperative access points 208 to arrive at a client device 212 at different times. By way of example and not limitation, the coordinator 206 may calibrate a delay associated with each cooperative access point 208 through a frame exchange between the coordinator 206 and respective cooperative access point 208. For example, the coordinator 206 may mark a first timestamp representing a time when sending a frame to the nth cooperative access point 208 and a second timestamp representing a time when the coordinator 206 receives an acknowledgement frame from the nth cooperative access point 208. Let $\Delta t$ be a difference between these two timestamps. Since the nth cooperative access point 208 sends the acknowledgement frame after a predefined time $\Delta t'$, the coordinator 206 may compute $\tau_n = \Delta t - \Delta t'$, and notify the nth cooperative access point 208 of this information. The nth cooperative access point 208 may then compensate its local timestamps by $\tau_n$ accordingly to ensure a time alignment of the signals transmitted by the cooperative access points including the nth cooperative access point 208.

Exemplary Methods

Figure 6:
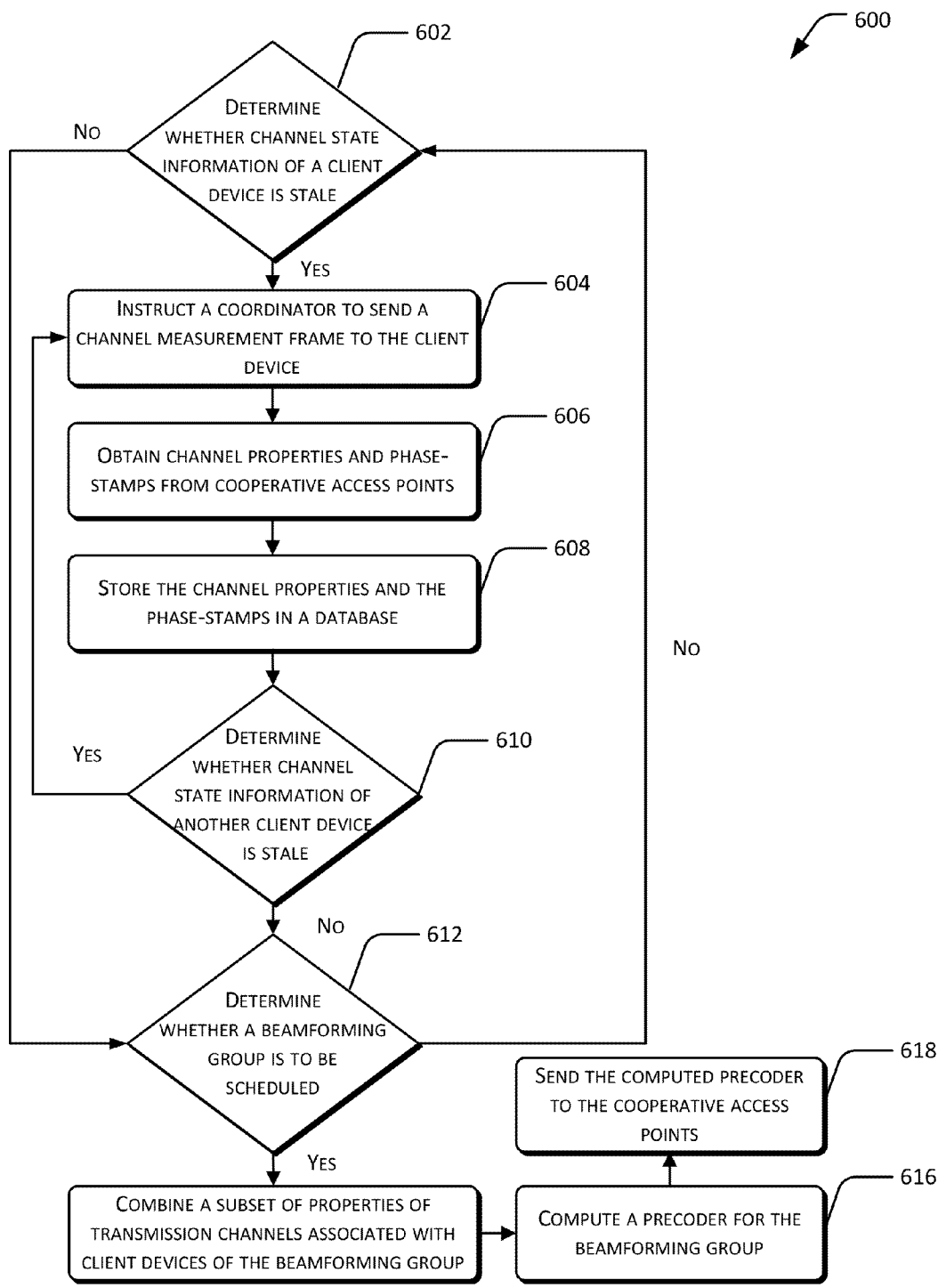
FIG. 6 illustrates an example method performed by the example controller of FIG. 2 in cooperative phase tracking.
Figure 7:
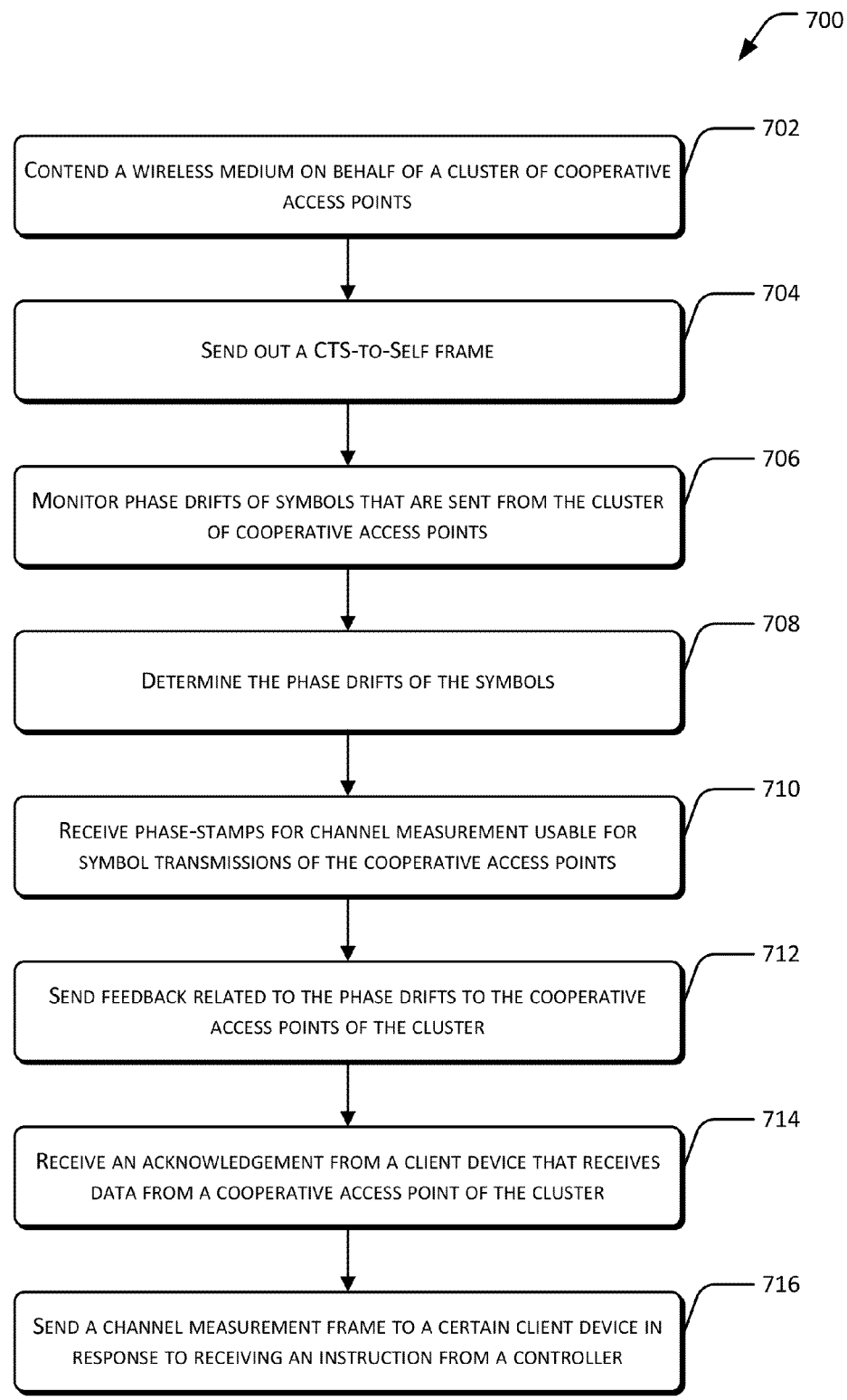
FIG. 7 illustrates an example method performed by the example coordinator of FIG. 2 in cooperative phase tracking.
Figure 8:
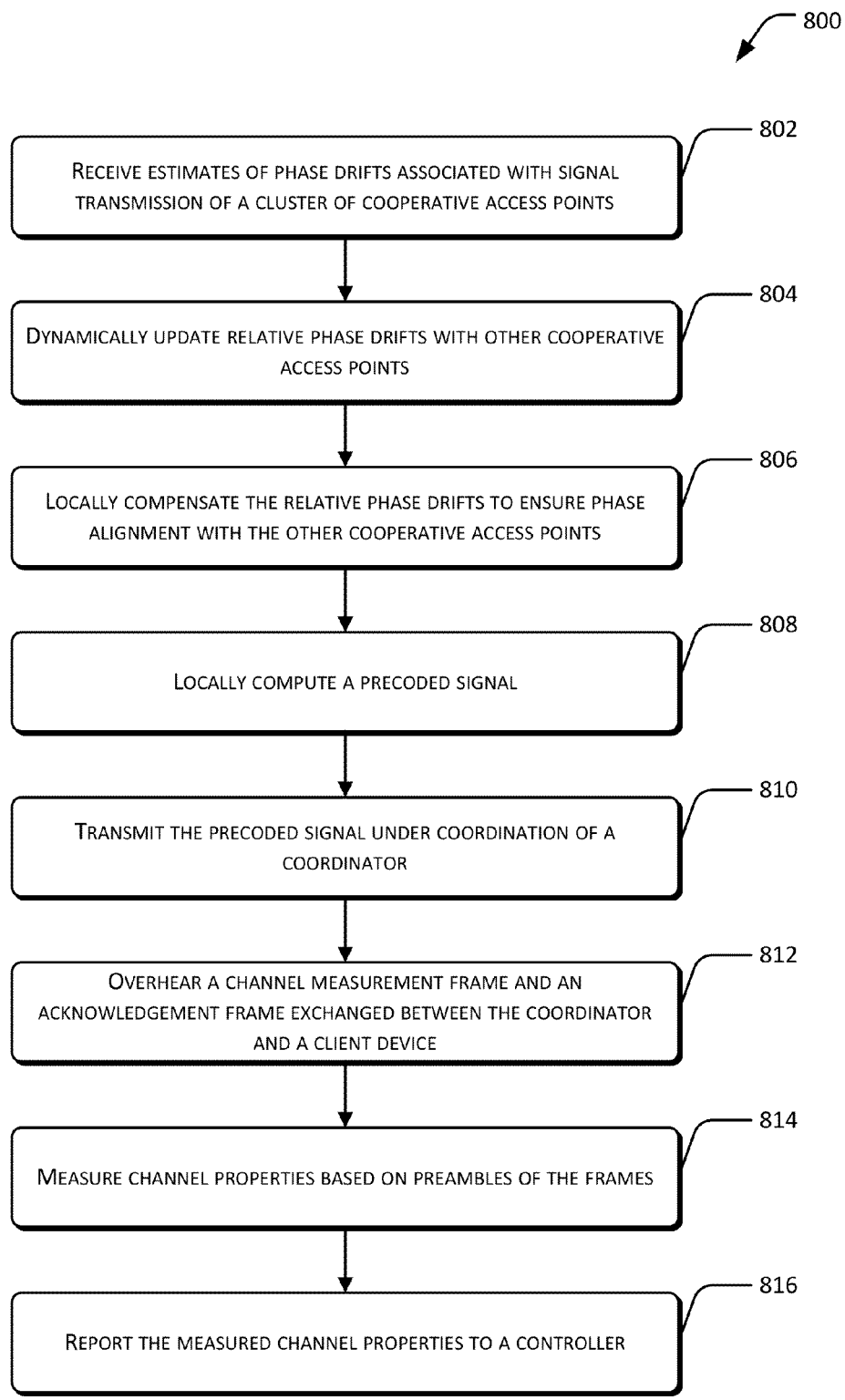
FIG. 8 illustrates an example method performed by the example cooperative access point of FIG. 2 in cooperative phase tracking.

FIG. 6 is a flow chart depicting an example method 600 performed by the controller 204 in cooperative phase tracking. FIG. 7 is a flow chart depicting an example method 700 performed by the coordinator 206 in cooperative phase tracking. FIG. 8 is a flow chart depicting an example method 800 performed by the cooperative access point 208 in cooperative phase tracking. The methods of FIGS. 6-8 may, but need not, be implemented in the environment of FIG. 2 and using the devices of FIGS. 3-5. For ease of explanation, methods 600-800 are described with reference to FIGS. 2-5. However, the methods 600-800 may alternatively be implemented in other environments and/or using other systems.

Methods 600-800 are described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The exemplary method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 6, at block 602, the controller 204 may determine whether channel state information of a client device 212 is stale or obsolete, for example, whether a timestamp of the channel state information of the client device 212 is older than a channel coherence time. In some embodiments, the controller 204 may determine that channel state information of one or more client devices 212 is stale or obsolete.

At block 604, in response to determining or detecting that the channel state information of the client device 212 is stale or obsolete, the controller 204 instructs the coordinator 206 to send a channel measurement frame independently to the client device 212, which replies with an acknowledgement frame. One or more cooperative access points overhear this frame exchanges between the coordinator 206 and the client device 212, and use preambles of the channel measurement frame and the acknowledgement frame to measure channel properties and phase-stamps associated with the one or more cooperative access points 208 and the client device 212 that are usable for pre-processing or precoding signals to be transmitted from the one or more cooperative access points 208.

At block 606, the controller 204 obtains the measured channel properties and the measured phase-stamps from the one or more cooperative access points 208.

At block 608, the controller 204 stores the measured channel properties and the measured phase-stamps in a database.

At block 610, the controller 204 determines whether channel state information of another client device 212 is stale or obsolete at another time. The controller 204 repeats sending an instruction to the coordinator 206 to obtain channel properties and phase-stamps associated with the other client device 212 at a later time.

At block 612, the controller 204 determines whether a beamforming group is to be scheduled for signal transmission.

At block 614, in response to determining that a beamforming group is to be scheduled for signal transmission, the controller combines a subset of the properties of transmission channels associated with client devices 212 included in the beamforming group together. For example, the controller may combine the subset of the properties of transmission channels that are measured at different time instances into an equivalent channel matrix as if the subset of the properties of transmission channels that are measured at a same time.

At block 616, the controller 204 further computes a precoder for the beamforming group based at least on the combined subset of the properties of transmission channels.

At block 618, the controller 204 sends the computed precoder to the cooperative access points 208.

Referring back to FIG. 7, at block 702, the coordinator 206 contends (or competes or obtains) a wireless medium for the cluster of cooperative access points 208. The coordinator 206 is connected to the cooperative access points 208 of the cluster through a wired network or connection such as an Ethernet connection.

At block 704, upon winning the wireless medium, the coordinator 206 sends out a (Clear to Send) CTS-to-Self frame. In one embodiment, the CTS-to-Self frame being configured to reserve a wireless medium for beamforming transmission and to synchronize symbol transmissions of the cooperative access points 208 of the cluster.

At block 706, the coordinator 206 monitors phase drifts of symbols that are sent from the cluster of cooperative access points 208.

At block 708, the coordinator 206 determines or estimates the phase drifts of the symbols that are sent from the cooperative access points 208 of the cluster. In one embodiment, the coordinator 206 determines or estimates the phase drifts based on knowledge of content of the symbols that are sent from the cluster of the cooperative access points 208. Additionally or alternatively, the coordinator 206 determines or estimates the phase drifts by estimating a relative phase of each symbol of a cooperative access point 208 of the cluster using a Kalman filter.

At block 710, the coordinator 206 receives phase stamps for channel measurements usable for symbol transmissions of the cooperative access points 208 of the cluster.

At block 712, the coordinator 206 sends feedbacks related to the phase drifts of the symbols to the cooperative access point 208 of the cluster. In one embodiment, the feedbacks includes the estimates of the phase shifts associated with the cooperative access point 208 of the cluster.

At block 714, the coordinator 206 may optionally receive an acknowledgement from a client device 212 that receives a frame from a cooperative access point 208 of the cluster.

At block 716, the coordinator 206 may send a channel measurement frame to a certain client device 212 in response to receiving an instruction from the controller 204 indicating that channel state information associated with that client device 212 is stale. The coordinator 206 may receive an acknowledgement from the client device 212 that responds to the channel measurement frame. This exchange of frames between the coordinator 206 and the client device 212 enables the cooperative access points 208 of the cluster to determine channel properties that are usable for estimating or measuring (relative) phase drifts among the cooperative access points 208.

Referring back to FIG. 8, at block 802, the cooperative access point 208 receives estimates of phase drifts associated with signal transmission of a cluster of cooperative access points 208.

At block 804, the cooperative access point 208 dynamically updates relative phase drifts with other cooperative access points of the cluster of cooperative access points.

At block 806, the cooperative access point 208 locally compensates the relative phase drifts to ensure a phase alignment with the other cooperative access points.

At block 808, the cooperative access point 208 locally computes a precoded signal.

At block 810, the cooperative access point 208 transmits the precoded signal under coordination of or in accordance with a schedule received from the coordinator 206 to synchronize a transmission time with the other cooperative access points 208.

At block 812, the cooperative access point 208 overhears a channel measurement frame and an acknowledgement frame that are exchanged between the coordinator 206 and a client device 212 when channel state information of the client device 212 is found to be stale as indicated in the channel measurement frame sent by the coordinator 206 to the client device 212.

At block 814, the cooperative access point 208 measures properties of a first channel with the coordinator 206 and properties of a second channel with the client device 212 based on preambles of the frames.

At block 816, the cooperative access point 208 reports the measured properties of the first channel and the measured properties of the second channel to a controller.

Although the foregoing embodiments describe that the controller 204, the coordinator 206 and the cooperative access points 208 perform different functions and/or roles in cooperative phase tracking, some or all of the functions performed by one entity (such as the controller 204, the coordinator 206 or the cooperative access point 208) may be performed by one or more other entities (such as the controller 204, the coordinator 206 or the cooperative access point 208) different from that one entity. For example, some or all of the functions performed by the controller 204 may be performed by the coordinator 206 and/or one or more cooperative access points 208, or vice versa. For another example, some or all of the functions performed by the coordinator 206 may be performed by the controller 204 and/or one or more cooperative access points 208, or vice versa.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although embodiments have been described in language specific to structural features and/or methodological acts, it is to be understood that the claims are not necessarily limited to the specific features or acts described. Rather, the specific features and acts are disclosed as exemplary forms of implementing the claimed subject matter.

What is claimed is:

1. A device comprising:
   one or more processors;
   memory storing executable instructions that, when executed by the one or more processors, cause the one or more processors to perform acts comprising:
   monitoring phase drifts of symbols that are sent from one or more access points of a cluster of access points; and
   sending feedback related to the phase drifts of the symbols to the one or more access points of the cluster, the feedback related to the phase drifts of the symbols being dynamically updated to maintain a phase alignment between the one or more access points of the cluster.

2. The device of claim 1, the acts further comprising synchronizing transmission times of the one or more access points of the cluster.

3. The device of claim 1, the acts further comprising contending a wireless medium for the one or more access points of the cluster.

4. The device of claim 1, wherein the feedback comprises estimates of the phase drifts associated with the one or more access points of the cluster.

5. The device of claim 1, the acts further comprising receiving an acknowledgement from a client device that receives a frame from an access point of the cluster.

6. The device of claim 1, the acts further comprising sending out a (Clear to Send) CTS-to-Self frame, the CTS-to-Self frame being configured to reserve a wireless medium for beamforming a transmission and to synchronize symbol transmissions of the one or more access points of the cluster.

7. The device of claim 1, the acts further comprising receiving phase stamps for channel measurements usable for symbol transmissions of the one or more access points of the cluster from a controller associated with the cluster.

8. The device of claim 1, the acts further comprising determining the phase drifts of the symbols that are sent from the one or more access points of the cluster.

9. The device of claim 8, wherein determining the phase drifts comprises determining the phase drifts based on content of the symbols that are sent from the cluster of the access points.

10. The device of claim 8, wherein determining the phase drifts comprises estimating a relative phase of each symbol of an access point of the cluster using a Kalman filter.

11. The device of claim 1, the acts further comprising sending a channel measurement frame to a client device in response to receiving an instruction from a controller indicating that channel state information associated with the client device is stale.

12. The device of claim 1, wherein the device is connected to the one or more access points of the cluster through a wired network.

13. One or more computer-readable media devices storing executable instructions that, when executed by one or more processors, cause the one or more processors to perform acts comprising:
   receiving estimates of phase drifts associated with signal transmission of a plurality of access points;
   dynamically updating phase drifts of signals to be sent relative to signals of other access points of the plurality of access points; and
   locally compensating the relative phase drifts to align phases of the signals to be sent with phases of the signals of the other access points.

14. The one or more computer-readable media devices of claim 13, the acts further comprising:
   overhearing exchanges of frames between a coordinator and a client device;
   measuring properties of a first channel associated with the coordinator and properties of a second channel associated with the client device based on preambles of the frames; and
   reporting the measured properties of the first channel and the measured properties of the second channel to a controller.

15. The one or more computer-readable media devices of claim 13, the acts further comprising:
   locally computing a precoded signal; and
   transmitting the precoded signal according to a schedule received from the coordinator to synchronize a transmission time with the other access points.

16. One or more computer-readable devices storing executable instructions that, when executed by one or more processors, cause the one or more processors to perform acts comprising:
   monitoring phase drifts of symbols that are sent from one or more access points of a cluster of access points; and
   sending feedback related to the phase drifts of the symbols, the phase drifts being dynamically updated to maintain a phase alignment between the one or more access points of the cluster to at least one of the one or more access points of the cluster.

17. The one or more computer-readable media devices of claim 16, the acts further comprising:
receiving phase stamps for channel measurements usable for symbol transmission of the access points of a cluster of access points from a controller associated with the cluster;
storing the phase stamps into a CSI database in the controller associated with the cluster.

18. The one or more computer-readable media devices of claim 16, the acts further comprising:
receiving phase stamps for channel measurements usable for symbol transmission of the one or more access points of the cluster of access points from a controller associated with the cluster; and
picking up a client device associated with a channel having a most recent phase stamp.

19. The one or more computer-readable media devices of claim 16, the acts further comprising:
receiving phase stamps for channel measurements usable for symbol transmission of the one or more access points of the cluster of access points from a controller associated with the cluster; and
measuring a phase stamp from a Clear-to-Self (CTS) frame.

20. The one or more computer-readable media devices of claim 16, the acts further comprising:
receiving phase stamps for channel measurements usable for symbol transmission of the one or more access points of the cluster of access points from a controller associated with the cluster; and
using a preamble of a channel measurement frame and an acknowledgement frame to measure the phase stamps associated with the one or more access points of the cluster.

* * * * *